US012687474B2

(12) United States Patent
Mohandas et al.

(10) Patent No.: US 12,687,474 B2
(45) Date of Patent: Jul. 21, 2026

(54) HARDNESS TESTING SYSTEM

(71) Applicant: SAUDI ARABIAN OIL COMPANY, Dhahran (SA)

(72) Inventors: Subindas Melapurakkal Mohandas, Dhahran (SA); Tariq A. Al-Ghamdi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 680 days.

(21) Appl. No.: 18/069,107

(22) Filed: Dec. 20, 2022

(65) Prior Publication Data

US 2024/0201059 A1     Jun. 20, 2024

(51) Int. Cl.
*G01N 3/48* (2006.01)
*G06T 7/00* (2017.01)
*G06T 7/60* (2017.01)

(52) U.S. Cl.
CPC ................. *G01N 3/48* (2013.01); *G06T 7/60* (2013.01); *G06T 7/97* (2017.01); *G01N 2203/008* (2013.01)

(58) Field of Classification Search
CPC ...... G01N 2203/008; G01N 3/48; G01N 3/42; G06T 7/60; G06T 7/97
See application file for complete search history.

(56) References Cited

U.S. PATENT DOCUMENTS

| | | | | |
|---|---|---|---|---|
| 4,463,600 A | * | 8/1984 | Hobbs ................. | G01B 11/285 356/626 |
| 4,653,106 A | * | 3/1987 | Yamatsuta .......... | G01B 11/024 382/141 |
| 4,945,490 A | * | 7/1990 | Biddle, Jr. ............... | G01N 3/42 702/33 |
| 5,146,779 A | * | 9/1992 | Sugimoto ................ | G01N 3/40 356/626 |

(Continued)

FOREIGN PATENT DOCUMENTS

| | | | | |
|---|---|---|---|---|
| CN | 104422629 A | | 3/2015 | |
| CN | 107796718 A | * | 3/2018 | ............... G01N 3/40 |

(Continued)

OTHER PUBLICATIONS

Marked up English translation of Koshimizu (JP-2017090071-A (Year: 2017).*

(Continued)

*Primary Examiner* — Michael Robert Cammarata

(74) *Attorney, Agent, or Firm* — Vorys, Sater, Seymour and Pease LLP

(57)     ABSTRACT

The present disclosure relates to hardness testing. In some examples, a system can include memory to store machine-readable instructions, which can be executed by one or more processors to implement a method of determining a hardness of a test material. The machine-readable instructions can include a hardness tester that can be programmed to receive image data that can include one or more images of a test material under hardness testing, analyze the image data to (Continued)

determine an indentation size on a surface of the test material left behind by an indenter during the hardness testing of the test material, and predict the hardness of the test material based on the determined indentation size.

16 Claims, 5 Drawing Sheets

(56)                    References Cited

U.S. PATENT DOCUMENTS

| | | | | |
|---|---|---|---|---|
| 6,134,954 | A * | 10/2000 | Suresh | G01N 3/42 |
| | | | | 702/33 |
| 6,155,104 | A * | 12/2000 | Suresh | G01N 3/42 |
| | | | | 73/789 |
| 7,472,603 | B2 * | 1/2009 | Kim | G01N 3/42 |
| | | | | 73/789 |
| 9,063,048 | B2 * | 6/2015 | Koshimizu | G01N 3/42 |
| 9,319,221 | B1 * | 4/2016 | Awad | H04L 9/3231 |
| 9,417,171 | B2 | 8/2016 | Takemura et al. | |
| 10,024,774 | B2 * | 7/2018 | Koshimizu | G01N 3/42 |
| 11,156,537 | B2 | 10/2021 | Kawazoe et al. | |
| 11,536,636 | B2 * | 12/2022 | Shinza | G06T 7/0004 |
| 12,025,589 | B2 * | 7/2024 | Han | G01N 3/08 |
| 2013/0215263 | A1 * | 8/2013 | Ariga | G01N 3/42 |
| | | | | 348/135 |
| 2014/0177937 | A1 * | 6/2014 | Ariga | G01N 3/42 |
| | | | | 382/141 |
| 2014/0294282 | A1 * | 10/2014 | Miyakura | G06V 10/7515 |
| | | | | 382/141 |
| 2015/0376396 | A1 * | 12/2015 | Lee | C08L 55/02 |
| | | | | 525/186 |
| 2016/0093068 | A1 * | 3/2016 | Sugai | H04N 23/631 |
| | | | | 348/135 |
| 2017/0074765 | A1 * | 3/2017 | Koshimizu | G01N 3/42 |
| 2017/0212023 | A1 * | 7/2017 | Mazzoleni | G01B 11/285 |
| 2018/0107805 | A1 * | 4/2018 | Anantharaman | G06F 3/011 |
| 2018/0313732 | A1 * | 11/2018 | Mazzoleni | G01N 3/62 |
| 2019/0128787 | A1 * | 5/2019 | Sadahiro | G01N 3/068 |
| 2020/0001640 | A1 * | 1/2020 | Fenton | B44F 1/06 |
| 2020/0363319 | A1 * | 11/2020 | Teraoka | G01N 21/55 |
| 2021/0142503 | A1 * | 5/2021 | Knight | G06T 7/64 |
| 2023/0067408 | A1 * | 3/2023 | Lee | G01N 3/42 |
| 2024/0307906 | A1 * | 9/2024 | Kantimm | G01J 3/027 |

FOREIGN PATENT DOCUMENTS

| | | | | |
|---|---|---|---|---|
| CN | 109724890 A | * | 5/2019 | G01N 3/42 |
| CN | 110082233 A | * | 8/2019 | G01N 3/44 |
| CN | 111982728 A | * | 11/2020 | G01N 3/42 |
| CN | 112945704 A | * | 6/2021 | G01N 3/42 |
| CN | 113433014 A | * | 9/2021 | G01N 3/48 |
| CN | 215448829 U | * | 1/2022 | |
| CN | 115356225 A | * | 11/2022 | B24B 49/12 |
| CN | 217717229 U | * | 11/2022 | |
| CN | 119178803 A | * | 12/2024 | G01N 29/42 |
| GB | 2071842 A | | 9/1981 | |
| GB | 2084721 A | * | 4/1982 | G01N 3/42 |
| JP | 2004198293 A | * | 7/2004 | |
| JP | 2017090071 A | * | 5/2017 | G01N 3/44 |
| JP | 2017223444 A | * | 12/2017 | |
| KR | 920000150 Y1 | * | 1/1992 | G01N 3/42 |
| KR | 101639895 B1 | * | 7/2016 | C22C 38/38 |
| KR | 20170075109 A | * | 7/2017 | G01N 33/20 |
| RU | 10882 U1 | * | 8/1999 | |
| RU | 2320974 C2 | * | 3/2008 | |
| SU | 1714438 A1 | * | 2/1992 | |
| TR | 2021019471 A2 | * | 12/2021 | G01N 3/00 |

OTHER PUBLICATIONS

Marked up English translation of Zheng (CN 107796718 A). (Year: 2018).*

T. Sugimoto and T. Kawaguchi, "Development of an automatic Vickers hardness testing system using image processing technology," in IEEE Transactions on Industrial Electronics, vol. 44, No. 5, pp. 696-702, Oct. 1997, doi: 10.1109/41.633474. (Year: 1997).*

C. Shilin and B. S. Wei, "Hardness indentation detection and classification technology based on image processing," 2022 IEEE International Conference on Real-time Computing and Robotics (RCAR), Guiyang, China, 2022, pp. 162-167, doi: 10.1109/RCAR54675.2022.9872294 (Year: 2022).*

H. .-J. Albrecht, et al."Can nanoindentation help to determine the local mechanical properties of microelectronic materials? a state-of-the-art review," Proceedings of 6th Electronics Packaging Technology Conference (EPTC 2004) (IEEE Cat. No. 04EX9 (Year: 2004).*

\* cited by examiner

100

400 ⇤

RECEIVING IMAGE DATA FOR A TEST MATERIAL DURING A MATERIAL HARDNESS TEST ∽ 402

ANALYZING THE IMAGE DATA TO DETERMINE AN INDENTATION SIZE ON A SURFACE OF THE TEST MATERIAL ∽ 404

PREDICTING A HARDNESS OF THE TEST MATERIAL BASED ON THE DETERMINED INDENTATION SIZE AND A HARDNESS CONVERSION TABLE ∽ 406

500

HARDNESS TESTING SYSTEM

FIELD OF THE DISCLOSURE

This disclosure relates generally to material hardness testing, and more particularly, to a digital hardness testing system.

BACKGROUND OF THE DISCLOSURE

Hardness is a measure of resistance to localized deformation induced by either mechanical indentation or abrasion. In general, different materials differ in their hardness; for example, hard metals such as titanium and beryllium are harder than soft metals such as sodium and metallic tin, or wood and other common materials. Macroscopic hardness is generally characterized by strong intermolecular bonds, but the behavior of solid materials under force is complex; therefore, hardness can be measured in different ways, such as scratch, indentation, and rebound hardness. Indentation hardness measures a resistance of a sample to material deformation due to a constant compression load from a sharp object.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a system can include memory to store machine-readable instructions, and one or more processors to access the memory and execute the machine-readable instructions to implement a hardness tester operable to receive image data that can include one or more images of a test material under hardness testing, analyze the image data to determine an indentation size on a surface of the test material left behind by an indenter during the hardness testing of the test material, and predict a hardness of the test material based on the determined indentation size.

In another embodiment consistent with the present disclosure, a method for determining a hardness of a test material can include imaging, using a digital micro-dimension (DM) camera, a test material to capture a formed indentation on a surface of the test material, generating, using the DM camera, image data comprising one or more images of the formed indentation on the surface of the test material, receiving, using a hardness test device, the image data, determining, using the hardness test device, an indentation size on the surface of the test material, and predicting, using the hardness test device, a hardness of the test material based on the determined indentation size.

Any combinations of the various embodiments and implementations disclosed herein can be used in a further embodiment, consistent with the disclosure. These and other aspects and features are better appreciated according to the following description of certain embodiments presented herein in accordance with the disclosure and the accompanying drawings and claims.

DETAILED DESCRIPTION

Figure 1:
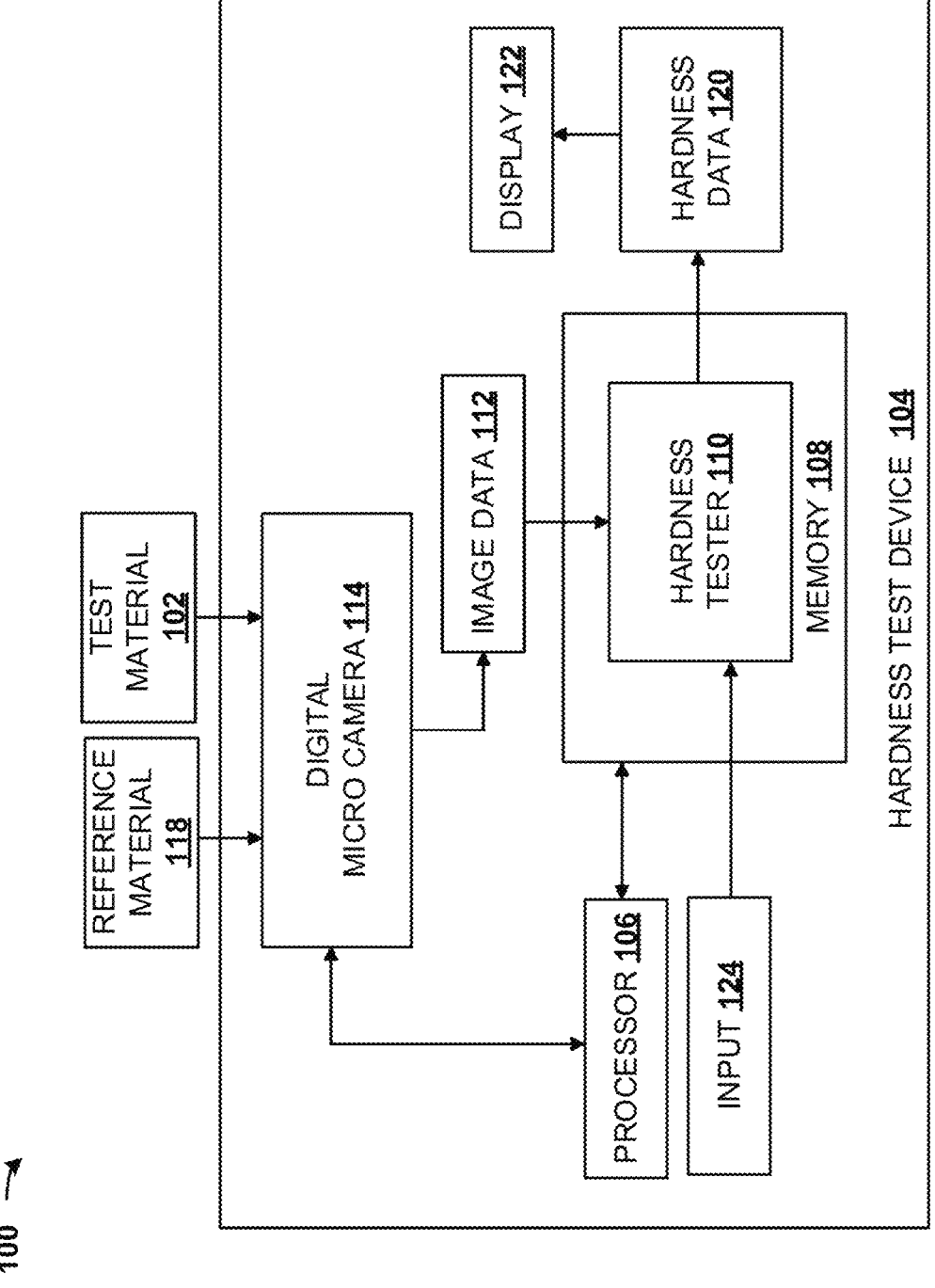
FIG. 1 is an example of a system for testing a hardness of a material.

Embodiments of the present disclosure will now be described in detail with reference to the accompanying Figures. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details.

Embodiments in accordance with the present disclosure generally relate to hardness testing. Hardness tests are used to evaluate a material's properties, such as strength, ductility and wear resistance, and can help determine whether a weld or weld material is suitable for its intended purpose. Generally, in the oil and gas industry, hardness is measured according to a Brinell chart (or scale), wherein each value therein represents a hardness value (a Brinell hardness number or BHN).

Existing hardness testing techniques in the oil and gas industry are heavily reliant on human intervention where a hardness testing technician uses a hardness telescope, a hardness bar and a ball indenter, a hammering tool, and a hardness chart (e.g., the Brinell chart). The ball indenter is positioned (e.g., sandwiched) between the hardness bar and a test material (e.g., a surface of a pipe, or some other metal) and hammered. An indentation or metal deformation of the hardness bar and the subject (test) material results. The technician measures the size of the indent on both the hardness bar and the test material using the hardness telescope. The measured indent sizes are then compared (e.g., benchmarked) against the hardness chart to identify a hardness value for the test material. The identified hardness value is then compared against a reference hardness value, which can be defined, for example, according to a specification or standard (e.g., a company or organizational standard). The test material can be identified or flagged as acceptable in response to determining that the identified hardness value is less than or equal to the reference hardness value.

Examples are described herein in which a portable hardness testing device is used for material hardness testing and improves an accuracy in determining the hardness of a material, which can be referred to herein as a material under test or "test material". In some examples, the portable hardness test can be undertaken to evaluate hardness properties of weld joints between pipes (e.g., oil or gas pipes). While examples are presented relating to hardness testing of metal materials, in other examples, the portable hardness testing device can be configured for non-metal material testing. Additionally, the portable hardness device can be used in other industries outside of oil and gas, for example, in the marine industry, the railway industry, a testing laboratory, etc. Thus, the portable hardness testing device as described herein can be used in any environment or industry for hardness testing of metal and non-metal materials.

The portable hardness testing device can include a hardness tester (e.g., implemented as machine readable instructions) that can receive image data that include one or more images of a test material under hardness testing. The image data can be provided by a digital micro-dimension (DM) camera to capture a formed indentation on a surface of the test material left behind by an indenter during the hardness testing of the test material. The hardness tester can analyze the image data to determine an indentation size on the surface of the test material left behind by the indenter. For example, the hardness tester can determine a depth of the indentation as well as other dimensions of the indentation. The hardness tester can then predict a hardness of the test material based on the determined indentation size and a hardness conversion table.

FIG. 1 is an example of a hardness testing system 100 that can be used to evaluate a hardness of a test material 102, according to one or more embodiments of the present disclosure. The test material 102 can be representative of a metal material, for example, of a pipe used in the oil and gas industry. The hardness testing system 100 includes a hardness test device 104, which can include a portable device that allows for remote hardness testing, for example, at a project or site. The hardness test device 104 can be used to evaluate one or more material properties of the test material 102, for example, a strength, a ductility and/or wear resistance of the test material.

The hardness test device 104 includes a processor 106 and memory 108. By way of example, the memory 108 can be implemented as a non-transitory computer storage medium, such as volatile memory (e.g., random access memory), non-volatile memory (e.g., a hard disk drive, a solid-state drive, a flash memory, or the like) or a combination thereof. The processor 106 could be implemented, for example, as one or more processor cores. The memory 108 can store machine-readable instructions that can be retrieved and executed by the processor 106. The machine-readable instructions can include a hardness tester 110 (e.g., a software module) that can be executed by the processor 106 to determine a hardness value for the test material 102 based on image data 112. The image data 112 can be provided by a digital micro-dimension (DM) camera 114, as shown in FIG. 1.

In the example of FIG. 1, the hardness test device 104 includes digital micro-dimension (DM) camera 114. In other examples, the DM camera 114 can be implemented as a plug-in device that can interface with the hardness test device 104 via an interface (not shown in FIG. 1). For example, if the hardness tester 110 is implemented on a portable device, for example, a laptop, or a device with an interface that can support connection of the DM camera 114, the DM camera 114 can be connected to the portable device and provide the image data 112 via a connection therein (e.g., over a wired connection). In some examples, the interface is a plug-and-play interface, such as a universal serial bus (USB) interface. Thus, in some examples, the DM camera 114 can be implemented as a pluggable USB DM camera. In some examples, the DM camera 114 is implemented as a stereo camera, or a stereo/depth DM camera. In further examples, the DM camera 114 is implemented as a Brinell microscope camera.

To test or verify a hardness of the test material 102, the DM camera 114 can be used to image the test material 102 and thereby provide the image data 112. Thus, the image data 112 can include one or more images of the test material 102. During hardness testing of the test material 102, a material surface of the test material 102 can be indented using an indenter (e.g., a carbide ball), which results in an indentation on a surface of the test material 102. The DM camera 114 may then be arranged to capture images of the indent made by the indenter on the surface of the test material 102 and thereby provide the image data 112.

While examples are described wherein a ball indenter is used for the hardness testing, in other examples, a different type of indenter can be used, such as a cone, a pyramid, etc. Moreover, examples of Brinell hardness testing are described herein, however, in other implementations; the hardness test device 104 can be adapted for Vickers hardness or Rockwell hardness tests.

Due to anisotropy in a deformation behavior, an indentation surface may not have an exactly circular imprint on the material surface of the test material 102. Anisotropy effects in the deformation behavior can introduce accuracy errors into hardness determinations, which, in some instances (e.g., applications or industries), may be impractical or undesirable. In some examples, the hardness testing includes using a reference material 118 to mitigate or reduce anisotropy effects. The reference material 118 can correspond to a hardness bar. For example, during hardness testing of the test material 102, a surface of the test material 102 and the reference material 118 can be simultaneously indented using the indenter to cause an indentation on each respective material surface. The DM camera 114 can then be employed to capture images of the resulting indents made by the ball indenter on each respective material surface to provide the image data 112.

The hardness tester 110 may then be configured to analyze the image data 112 to determine an indentation size for each indent on each of the test material 102 and the reference material 118. The indentation size can include a diameter of the indent left by the ball indenter on each material 102 and 118. In some instances, the hardness tester 110 can determine a depth of each indent from the ball indenter on each material 102 and 118. Thus the term "size" is intended to encompass depth as well as other dimensions. In some instances, the hardness tester 110 can average an indentation size for each of the materials 102 and 118 to compute an average indentation size (e.g., an average diameter and/or depth). Thus, in some instances, the average indentation size is computed by the hardness tester 110 based on an indentation size for indents of respective materials 102 and 118. In certain embodiments, the hardness tester 110 can analyze other features of the captured image of the indent or impression, such as color, smoothness or graininess, that may correlate to hardness of the material.

The hardness tester can predict the hardness of the test material based on the indentation size, or in other instances, based on the average indentation size computed according to the examples described herein. For example, the hardness tester 110 can compare the indentation size or the average indentation size to a hardness conversion table to determine a respective hardness value representative of the hardness of the test material 102 therein. In an example, the hardness conversion table includes Brinell hardness values for indentation sizes.

In some examples, the hardness conversion table is implemented as a database stored in the memory 108, and the hardness tester 110 can query the database to identify the respective hardness value. As an example, to determine the respective hardness value, the hardness tester 110 can identify neighboring indentation size values between which the indentation size or the average indentation size was computed according to the examples described herein. The hardness tester 110 can average hardness values associated with the neighboring indentation size values in the hardness conversion table to determine the respective hardness value. Thus, the hardness tester 110 can determine respective hardness values by averaging the hardness value of respective neighboring indentation size values between which the indentation size or the average indentation size was computed according to the examples described herein.

In some examples, the hardness tester 110 can compare the indentation size computed for the test material 102 and the indentation size computed for the reference material 118 to the hardness conversion table to determine the respective hardness value for the test material 102. For instance, the hardness tester 110 can identify a first indentation size value from the hardness conversion table based on the comparison of the indentation size computed for the test material 102 relative to the hardness conversion table. The hardness tester 110 can identify a second indentation size value from the hardness conversion table based on the comparison of the indentation size computed for the reference material 118 relative to the hardness conversion table. For example, the hardness tester 110 can identify the first and second indentation size values by identifying a closest indentation size value from the table for each of the indentation sizes computed for the test and reference materials 102 and 118, respectively. In some instances, the hardness tester 110 averages hardness values associated with the first and second indentation size values from the hardness conversion table to determine the respective hardness value for the test material 102.

In some examples, the hardness tester 110 can output hardness data 120 characterizing the hardness value for the test material 102. The hardness data 120 can then be rendered on a display 122, and thus enable a user (e.g., a technician) to visualize a result of the hardness test for the test material 102. In some examples, the hardness data 120 can be stored in the memory 108 and access to this data in the memory 108 can be limited (e.g., requiring a password) to prevent forgery of the hardness data 120 even by authorized field technicians or users of the hardness test device 104. In some examples, the hardness data 120 is associated with a timestamp indicating a date and time that the hardness data 120 was generated by the hardness tester 110 based on the image data 112. In some examples, the hardness tester 110 can receive an input 124 to enable the hardness test device 104 to implement hardness testing of the test material 102. In some examples, the input 124 is an operating switch or a fingerprint scanner that can be activated to allow access to the hardness tester 110. Limiting or restricting access to the hardness tester 110 can mitigate or eliminate hardness forgeries by limiting use of the hardness test device to authorized users.

Using the hardness test device 104 for hardness testing eliminates the need for manual measuring (or recording) of hardness of a testing materials, minimizes human errors resulting from measurements, prevents or minimizes a likelihood of weld joint failure resulting from inaccurate hardness measurements, and reduces reliance on the efficiency or accuracy of a hardness technician. Furthermore, because the hardness test device 104 stores hardness measurements in digital form (e.g., in the memory 108), this can improve hardness measuring transparency as it will be known whether the technician implemented hardness testing as hardness measurements are captured digitally with a time stamp. Additionally, forgeries can be eliminated in a field as the digital stored hardness measurements (e.g., the hardness data 120) can be locked from editing or changing by a user.

Figure 2:
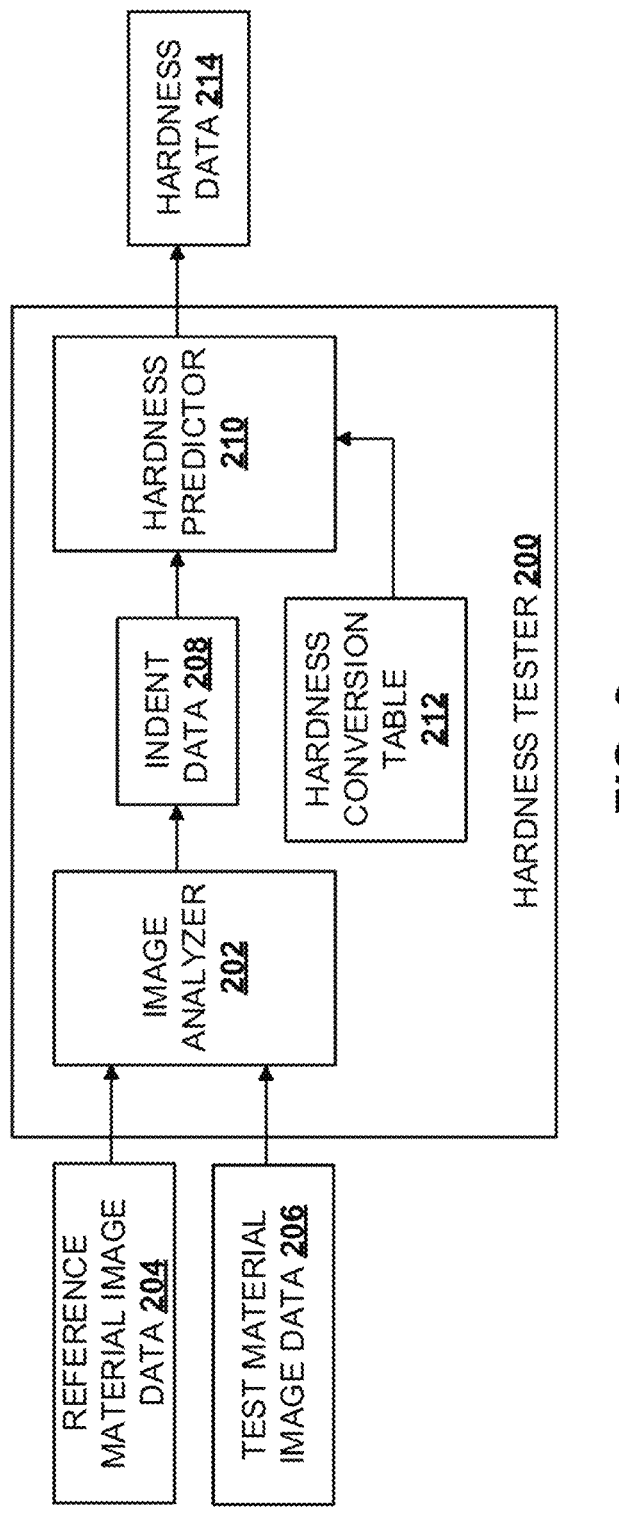
FIG. 2 is an example of a hardness tester.

FIG. 2 is an example of a hardness tester 200 that can be used to determine a hardness of a material, such as the test material 102, as shown in FIG. 1. In some examples, the hardness tester 200 is the hardness tester 110, as shown in FIG. 1. Thus, reference can be made to the example of FIG. 1 in the example of FIG. 2. The hardness tester 200 can be implemented using one or more modules, shown in block form in the drawings. The one or more modules can be in software or hardware form, or a combination thereof. In some examples, the hardness tester 200 can correspond to machine readable instructions that can be stored in the memory 108 and executed by the processor 106, as shown in FIG. 1.

The hardness tester 200 includes an image analyzer 202 that can analyze image data of corresponding materials indented during hardness testing to determine an indentation size of each indentation formed in the materials. For example, during a hardness test, a test material (e.g., the test material 102, as shown in FIG. 1) for which a hardness is desired to be known, and a reference material (e.g., the reference material 118, as shown in FIG. 1) can be indented with an indenter (e.g., a ball indenter). A DM camera (e.g., the DM camera 114, as shown in FIG. 1) can be used to capture images of the test material and the reference material in response to indenting the materials with the indenter to provide reference material image data 204 and test material image data 206, respectively. The image analyzer 202 can analyze each of the reference material image data 204 and the test material image data 206 to determine a corresponding indentation depth for the reference material and the test material. The image analyzer 202 can output indent data 208 characterizing the indentation size of the reference and/or test materials.

The hardness tester 200 may further include a hardness predictor 210 that can predict a hardness of the test material based on the indent data 208 and a hardness conversion table 212. The hardness conversion table 212 can identify a number of indentation sizes for corresponding hardness values. In some instances, the hardness predictor 210 can average indentation sizes computed by the image analyzer 202 to determine an average indentation size value. The hardness tester 200 can compare the determined average indentation size value to the indentation sizes identified in the hardness conversion table 212 to identify a nearest or closest indentation size and thus the related hardness value for the identified indentation size. The hardness tester 200 can output hardness data 214, which characterizes the hardness value that was identified based on the indent data 208 and the hardness conversion table 212. In some instances, the hardness data 214 can correspond to the hardness data 120, as shown in FIG. 1. In some embodiments, the hardness data 214 can be rendered on a display (e.g., the display 122, as shown in FIG. 1) to allow a user (e.g., a technician) to visualize a result of the hardness test for the test material.

In some examples, the hardness predictor 210 can store the hardness data 214 in the memory 108 and restrict access to the hardness data 214 to protect the hardness data 214 from unauthorized manipulation or forgery. The restricted access can included for example a password, or use of an input (e.g., the input 124, as shown in FIG. 1) to provide biometric readings. A biometric reading for an authorized user of the hardness data 214 referred to as a baseline biometric reading can be stored in the memory 108. The input can provide a biometric reading for a user requesting access to the hardness data 214 from the hardness predictor 210, which can evaluate the provided biometric reading to the baseline biometric reading to determine whether the user is to be granted access to the hardness data 214. For example, if the provided biometric reading matches the baseline biometric reading, the user can be granted access to the hardness data 214. Access to the hardness data 214 can enable the user to visualize the hardness data 214 on the display, manipulate the hardness data 214, transmit the hardness data 214 to another device or system, or store the hardness data 214 in a cloud environment (e.g., cloud computing environment).

Figure 3:
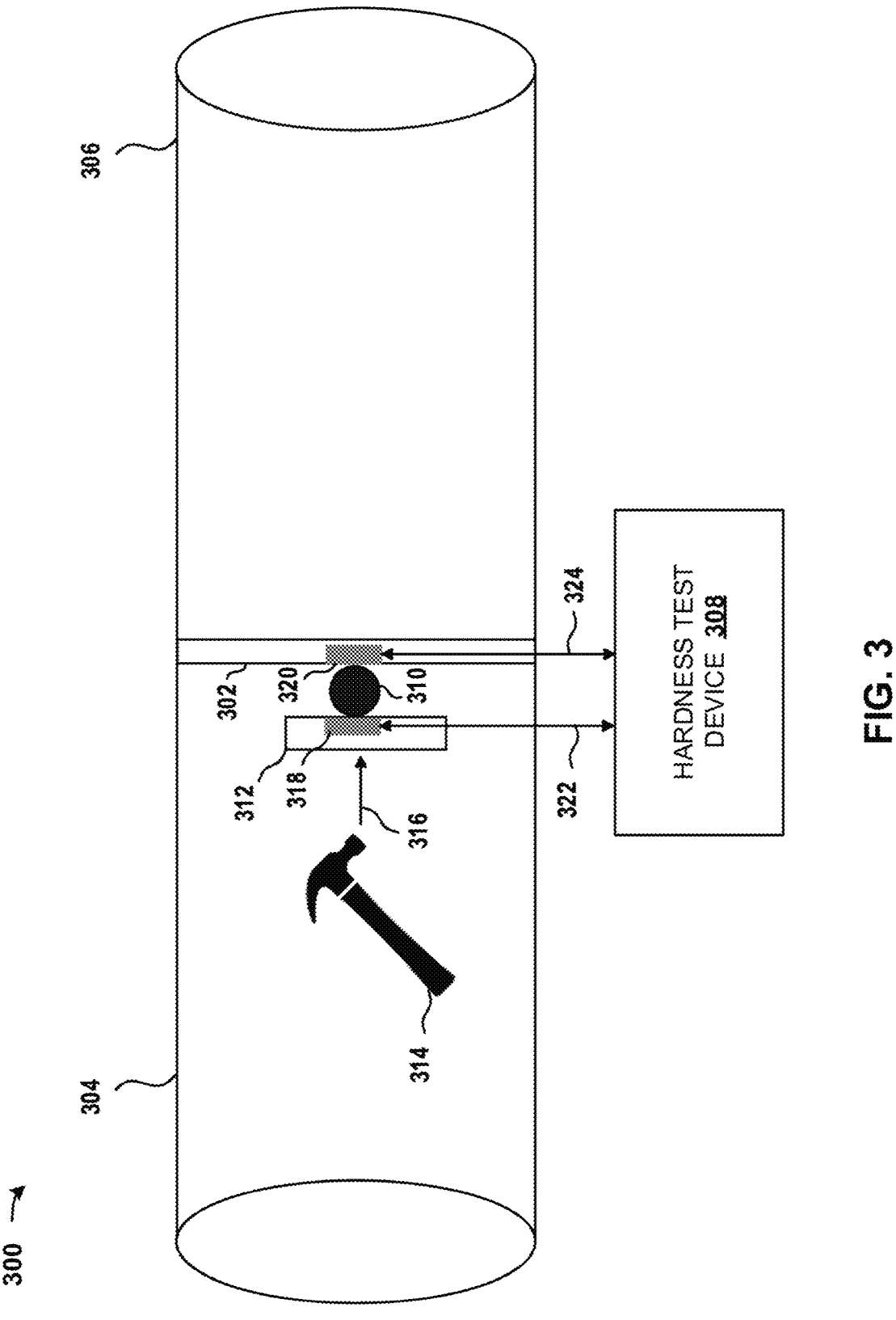
FIG. 3 is an example of a system for testing a hardness of a weld.

FIG. 3 is an example of a system 300 for hardness testing of a joint 302 between opposing pipes 304 and 306. The system 300 includes a hardness test device 308, which can be implemented similar to the hardness test device 104, as shown in FIG. 1. Thus, reference can be made to the example of FIGS. 1-2 in the example of FIG. 3. In the example of FIG. 3, the system 300 is used for inspecting a weld or a weld fusion line of the joint 302, also referred to as a "weld joint 302". Respective ends of the pipes 304 and 306 can be welded together to form the joint 302, as shown in FIG. 1.

In some applications, the pipes 304 and 306 can form part of an oil or gas infrastructure. For example, the pipes 304 and 306 can correspond to pipes within an upstream sector. The upstream sector (also known as exploration and production) covers exploration, recovery, and production of crude oil and natural gas. Examples are presented herein in which the hardness test device 308 is used for inspecting a weld between pipes in the upstream sector, however, in other examples, the hardness test device 308 can be used in other stages of operation, such as midstream and/or downstream sectors of the oil or gas industry, as well as in other industries. The midstream sectors covers transportation and storage of extracted crude oil and gas before refining and involves use of transmission pipelines and storage vessels created using welding. The downstream sector relates to refining crude oil in refineries and distributing a refined product.

To test a hardness of the joint 302, a ball indenter 310 is positioned between a reference or "hardness" bar 312 and the joint 302. A hammer 314 or a similar impact-producing tool can be used to apply a force 316 (impact) to the hardness bar 312, which causes the ball indenter 310 to indent each of the hardness bar 312 and the joint 302, thereby resulting in the formation of respective indentations 318 and 320, as shown in FIG. 3. The hardness test device 308 can be employed to capture images of the respective indentations 318 and 320, which is shown with double-sided arrows 322 and 324 in the example of FIG. 3. The hardness test device 308 can process the captured images according to the examples described herein to determine the hardness of the joint 302.

Figure 4:
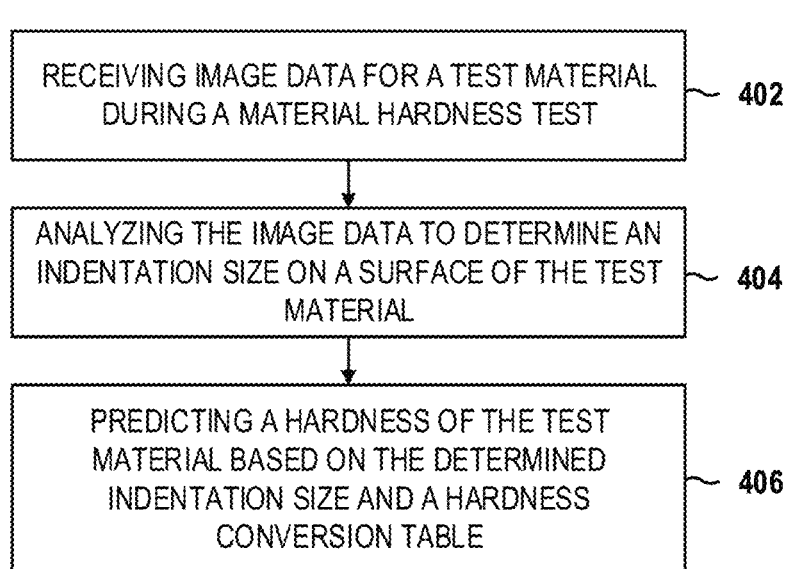
FIG. 4 is an example of a method for determining a hardness of a material.
Figure 5:
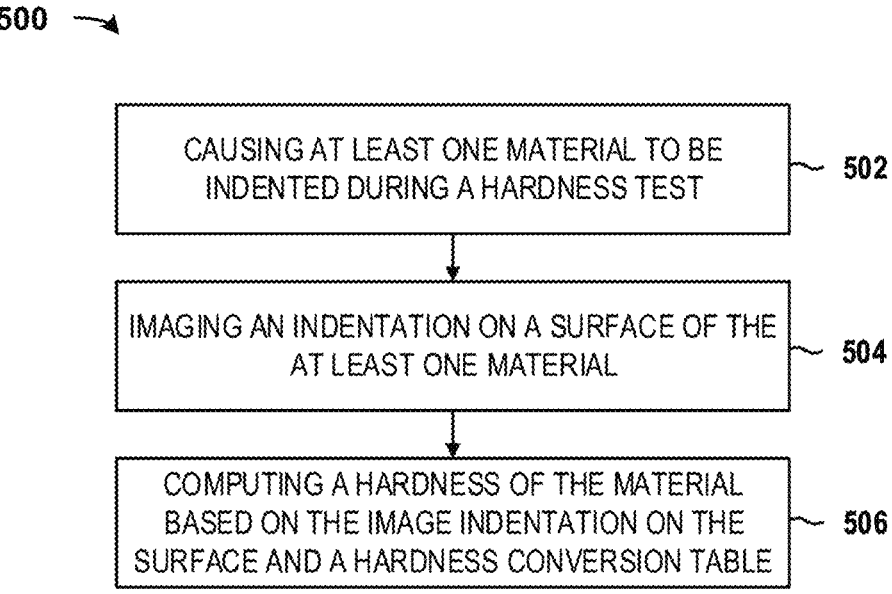
FIG. 5 is an example of another method for determining a hardness of a material.

In view of the foregoing structural and functional features described above, an example method will be better appreciated with reference to FIGS. 4-5. While, for purposes of simplicity of explanation, the example methods of FIGS. 4-5 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 4 is an example of a method 400 for determining a hardness of a material, for example, the test material 102, as shown in FIG. 1. The method 400 can be implemented by the hardness tester 110, as shown in FIG. 1, or the hardness tester 200, as shown in FIG. 2. Thus, reference can be made to the example of FIGS. 1-3 in the example of FIG. 4. The method 400 can begin at 402 by receiving (e.g., by the image analyzer 202, as shown in FIG. 2) image data (e.g., the image data 112, as shown in FIG. 1) that includes one or more images of a test material under hardness testing. At 404, analyzing (e.g., by the image analyzer 202) the image data can be undertaken to determine an indentation size on a surface of the material. At 406, predicting (e.g., by the hardness predictor 210, as shown in FIG. 2) a hardness of the material can be undertaken based on the determined indentation size and a hardness conversion table (e.g., the hardness conversion table 212, as shown in FIG. 2).

FIG. 5 is an example of a method 500 for determining a hardness of a material, for example, the test material 102, as shown in FIG. 1. The method 500 can be at least partially implemented by a hardness test device, such as the hardness test device 104, as shown in FIG. 1, or the hardness test device 308, as shown in FIG. 3. Thus, reference can be made to the example of FIGS. 1-3 in the example of FIG. 5. The method 500 can begin at 502 by causing at least one test material (e.g., the test material 102 and/or the reference material 118, as shown in FIG. 1) to be indented using an indenter during a hardness test of the at least one test material. For example, at 502, the hardness tester 110, as shown in FIG. 1, or the hardness tester 200, as shown in FIG. 2, can output instructions (e.g., on the display 122, as shown in FIG. 1) indicating a start of the hardness test. The outputted instructions can command a user or a system to apply a force using the indenter to the at least one test material to create or form an indentation on a surface of the at least one material. At 504, imaging (e.g., by the DM camera 114, as shown in FIG. 1) the at least one material (e.g., the test material 102 and/or the reference material 118, as shown in FIG. 1) can be undertaken to capture the formed indentation on the surface to provide image data (e.g., the image data 112, as shown in FIG. 1) of the formed indentation. At 506, computing (e.g., by the hardness tester 110, as shown in FIG. 1, or the hardness tester 200, as shown in FIG. 2) a hardness of the material may be undertaken based on the image data and a hardness conversion table (e.g., the hardness conversion table 212, as shown in FIG. 2).

In view of the foregoing structural and functional description, those skilled in the art will appreciate that portions of the embodiments described herein may be implemented as a method, data processing system, or computer program product. Accordingly, these portions of the present disclosure may take the form of an entirely hardware embodiment, an entirely software embodiment, or an embodiment combining software and hardware. Furthermore, portions of the embodiments herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments described herein have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks. These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The terminology used herein is for the purpose of describing particular embodiments only and is not intended to limit this disclosure. As used herein, the singular forms "a," "an," and "the" are intended to include the plural forms as well, unless the context clearly indicates otherwise. It will be further understood that the terms "contains", "containing", "includes", "including." "comprises", and/or "comprising." and variations thereof, when used in this specification, specify the presence of stated features, integers, steps, operations, elements, and/or components, but do not preclude the presence or addition of one or more other features, integers, steps, operations, elements, components, and/or groups thereof. Also, the phraseology and terminology used herein is for the purpose of description and should not be regarded as limiting. The use of "including." "comprising." "having." "containing." "involving." and variations thereof herein, is meant to encompass items listed thereafter and equivalents thereof as well as additional items. While the disclosure has described several exemplary embodiments, it will be understood by those skilled in the art that various changes can be made, and equivalents can be substituted for elements thereof, without departing from the spirit and scope of the invention.

In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

The invention claimed is:

1. A system for determining a hardness of a test material during hardness testing, the system comprising:
a Brinell microscope camera configured to generate image data during hardness testing, the image data comprising one or more images of a test surface of the test material and a reference surface of a hardness bar, each test surface and reference surface having one or more indentations formed and having one or more features including graininess;
memory to store machine-readable instructions;
one or more processors to access the memory and execute the machine-readable instructions to implement a hardness tester operable to:
receive the image data generated by the Brinell microscope camera in response to a hardness test, wherein a force is applied by a tool to the hardness bar to cause an indenter to form the one or more indentations on the test surface and the reference surface during hardness testing;
analyze the image data to determine an indentation size of each indentation on the test surface and the reference surface formed by the indenter;
computing an average indentation size of the determined indentation sizes of the test surface and the reference surface; and
predict, by a hardness predictor, a hardness of the test material based on the average indentation size.

2. The system of claim 1, wherein the hardness tester comprises an image analyzer programmed to evaluate the one or more images to determine the indentation size on the surface of the test material left behind by the indenter during the hardness testing of the test material.

3. The system of claim 2, wherein the image data comprises reference material image data comprising one or more images of the hardness bar and test material image data comprising one or more images of the test material.

4. The system of claim 3, wherein the one or images of the hardness bar and one or more images of the test material provide the reference material image data and the test material image data, respectively, during the hardness testing of the test material.

5. The system of claim 4, wherein the image analyzer is programmed to analyze the reference material image data to determine a reference indentation size on the reference surface and analyze the test material image data to determine a test indentation size on the test surface left behind by the indenter.

6. The system of claim 5, wherein the hardness tester further comprises a hardness predictor programmed to predict the hardness of the test material based on the average indentation size and a Brinell chart by comparing the predicted hardness of the test material to a reference hardness.

7. The system of claim 6, further comprising a display configured to display the hardness predicted by the hardness predictor.

8. The system of claim 7, further comprising a hardness test device and the hardness test device includes the memory, the one or more processors, and the digital MD camera.

9. The system of claim 8, wherein the hardness test device further comprises one of a switch or a fingerprint scanner for controlling access to data stored in the memory of the hardness test device.

10. The system of claim 9, wherein the hardness predictor is programmed to:
output hardness data with the predicted hardness;
store the hardness data in the memory; and
restrict access to the hardness data stored in the memory to one or more authorized users.

11. The system of claim 5, wherein the hardness tester further comprises a hardness predictor programmed to average the reference and test indentation sizes to compute the average indentation size and predict the hardness of the test material based on the average indentation size and a hardness conversion table.

12. The system of claim 1, wherein the hardness conversion table is implemented as a hardness conversion database and is stored in the memory, the hardness tester being programmed to query the hardness conversion database using the determined indentation size to predict the hardness of the test material.

13. A method for determining a hardness of a test material, the method comprising:

performing the hardness test by forming a reference indentation on a reference surface of a reference material and simultaneously forming a test indentation on a test surface of the test material;

imaging, using a digital micro-dimension (DM) camera, the reference and test materials to capture the formed indentations on the reference and test surfaces, and one or more features of the formed indentations including graininess;

generating, using the DM camera, image data comprising one or more images of the formed reference and test indentations on the respective reference and test surfaces;

receiving, using a hardness test device, the image data;

determining, using the hardness test device, a size for each of the reference and test indentations of the reference and test surfaces by analyzing the image data;

computing, using a hardness predictor of the hardness test device, an average indentation size based on the determined sizes of the reference and test indentations;

querying, using the hardness test device, a hardness conversion database stored in memory of the hardness test device using the computed average indentation size; and predicting, using the hardness test device, a hardness of the test material based on results of querying the hardness conversion database.

14. The method of claim 13, further comprising:

storing the predicted hardness of the test material in memory of the hardness test device as hardness test data; and restricting access to the stored hardness test data in the memory to one or more authorized users.

15. The method of claim 14, further comprising:

receiving, at the hardness test, a request to access the stored hardness test data in the memory; and one of granting or denying the request based on authorized user data stored in the memory for the one or more authorized users.

16. The method of claim 13, wherein simultaneous hardness testing of the reference and test material is performed using a single indenter to mitigate anisotropy effects across the reference and test materials.

* * * * *